United States Patent
Groenendijk

(10) Patent No.: US 8,453,625 B2
(45) Date of Patent: Jun. 4, 2013

(54) METHOD FOR OPERATING AN INTERNAL COMBUSTION ENGINE

(75) Inventor: Axel Groenendijk, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/567,069

(22) Filed: Aug. 5, 2012

(65) Prior Publication Data
US 2013/0000618 A1 Jan. 3, 2013

Related U.S. Application Data

(63) Continuation of application No. PCT/EP2010/007777, filed on Dec. 18, 2010.

(30) Foreign Application Priority Data

Feb. 6, 2010 (DE) .......................... 10 2010 007 071

(51) Int. Cl.
*F02M 25/07* (2006.01)
*F02B 47/08* (2006.01)

(52) U.S. Cl.
USPC ............... 123/568.12; 123/568.21; 123/90.15

(58) Field of Classification Search
USPC ................. 123/568.12, 568.21, 90.11, 90.15, 123/559.1; 60/605.2; 701/108
See application file for complete search history.

(56) References Cited

U.S. PATENT DOCUMENTS

| | | | |
|---|---|---|---|
| 4,194,472 A | 3/1980 | Amano et al. | |
| 6,758,195 B1 * | 7/2004 | Jaye .......................... | 123/568.13 |
| 7,472,696 B2 * | 1/2009 | Easley et al. ............. | 123/568.21 |
| 2002/0129798 A1 | 9/2002 | Urushihara et al. | |
| 2006/0102121 A1 | 5/2006 | Kalish et al. | |
| 2007/0235011 A1 | 10/2007 | Easley et al. | |

FOREIGN PATENT DOCUMENTS

| | | |
|---|---|---|
| AT | 507008 A2 | 1/2010 |
| DE | 19961292 C2 | 6/2001 |
| DE | 10324988 A1 | 12/2004 |
| DE | 102005053940 A1 | 6/2006 |
| DE | 102006000134 A1 | 9/2006 |

OTHER PUBLICATIONS

Search report for DE 10 2010 007 071.8 issued by the German patent office, dated Nov. 23, 2010.
International Search Report (Form PCT/ISA/210) for International Application No. PCT/EP2010/007777, dated Mar. 28, 2011.
Written Opinion of the International Searching Authority (Form PCT/ISA/237) for International Application No. PCT/EP2010/007777 and Translation of the Written Opinion, Aug. 7, 2012.

* cited by examiner

*Primary Examiner* — Hai Huynh
(74) *Attorney, Agent, or Firm* — Manfred Beck, P.A.

(57) ABSTRACT

A method for operating an internal combustion engine includes providing at least one gas exchange valve that is used by at least one of the working cylinders of the internal combustion engine as an exhaust-gas recirculation valve. In a predetermined operating state of the internal combustion engine, the exhaust-gas recirculation valve is opened at least twice within a working cycle of 720 degrees of the crankshaft, wherein an opening duration of the first opening of the exhaust-gas recirculation valve at least overlaps in time with an opening of the outlet valve during the exhaust stroke and wherein an opening duration of the second opening of the exhaust-gas recirculation valve at least overlaps in time with an opening duration of the inlet valve during the intake stroke, wherein the exhaust-gas recirculation valve is closed between the first opening and the second opening.

7 Claims, 2 Drawing Sheets

METHOD FOR OPERATING AN INTERNAL COMBUSTION ENGINE

CROSS-REFERENCE TO RELATED APPLICATIONS

This application is a continuation, under 35 U.S.C. §120, of copending International Application No. PCT/EP2010/007777, filed Dec. 18, 2010, which designated the United States; this application also claims the priority, under 35 U.S.C. §119, of German Patent Application No. DE 10 2010 007 071.8, filed Feb. 6, 2010; the prior applications are herewith incorporated by reference in their entirety.

BACKGROUND OF THE INVENTION

Field of the Invention

The invention relates to a method for operating an internal combustion engine having at least one working cylinder, in which a piston is moved up and down, so that, within an operating cycle of 720 degrees of the crankshaft, successively an intake stroke, a compression stroke, a power stroke and an exhaust stroke are performed, and the piston having at least three gas-exchange valves assigned thereto, the internal combustion engine further having an exhaust-gas line, and having at least one inlet port which leads into a gas exchange valve in the form of an inlet valve and which supplies, via this inlet valve, at least combustion air to the working cylinder, the internal combustion engine further having at least one outlet port which leads into a gas exchange valve in the form of an outlet valve and which, via this outlet valve, discharges at least exhaust-gas from the working cylinder into the exhaust-gas line, the internal combustion engine further having at least one exhaust-gas recirculation line which is connected to the exhaust-gas line of the internal combustion engine, wherein at least one of the gas exchange valves is used by at least one of the working cylinders as an EGR (exhaust-gas recirculation) valve and is supplied with exhaust-gas from an exhaust-gas recirculation line.

In case of a diesel engine, the exhaust-gas recirculation is one of the essential elements of a reduction of $NO_x$ implemented internally in the engine. A distinction is made between the "external" exhaust-gas recirculation (EGR), as is for example known from German Patent No. DE 199 61 292 C2, with cooled and uncooled alternatives and the "internal" EGR, as is for example known from German Patent Application Publication No. DE 10 2005 053 940 A1 which corresponds to U.S. Patent Application Publication No. US 2006/0102121 A1. In case of the internal exhaust-gas recirculation, the remaining behind or recirculation of residual gas is usually implemented by influencing the gas exchange valve control times by means of an additional opening of inlet valves or outlet valves or a negative valve overlap via a variable valve train. The advantages of the internal EGR over the external EGR are in this case the short paths and fast response times as well as the ability for direct metering. A disadvantage is however the lack of the possibility of an effective cooling of the residual gas as in the external EGR.

In the known Miller/Atkinson cycle, the point in time for "inlet valve closes" (IC) is shifted to late. In this way, fresh gas or combustion air, herein also referred to as a cylinder charge, which is already present in the cylinder, is partially pushed out again into an inlet port for combustion air. This means a charging disadvantage which is compensated by a charging with a suitable boost pressure. Here, the boost pressure in the volume between the charger output and the engine inlet is to be controlled such that the boost pressure in each Miller operating point, i.e. each operating point in which the Miller/Atkinson cycle is being used, corresponds to the theoretical final compression pressure in the working cylinders of the internal combustion engine at the point in time "inlet valve closes."

The positive effect of the Miller/Atkinson cycle on the $NO_x$ emission and the ability for homogenizing the diesel mixture, by using an early or late point in time for closing the inlet valve, is known. Furthermore, the tendency to knock in high-pressure charging can be significantly reduced for spark ignition engine applications. Unlike in the spark ignition engine (Otto cycle engine), which can operate with a positive valve overlap due to the absence of geometric constraints, in a diesel engine it is generally not possible to easily implement the method by means of a phase adjuster. This is due to a mechanical collision of the valve with the piston in an advance adjustment and increased pumping work in a retard adjustment.

Furthermore, there is normally only one inlet valve available for the "Miller phase" prior to the start of compression, which can remain opened prior to the start of compression up to crank angles far beyond the charge exchange-BDC (bottom dead center of the reciprocating piston after the charge exchange, i.e. between an exhaust stroke and an intake stroke) for the purpose of implementing the "Miller process." For the outflow of fresh gas from the working cylinder during the "Miller phase" prior to the start of compression, there is therefore only the volume of one inlet port available, even if two or more inlet ports are provided for the respective working cylinder.

SUMMARY OF THE INVENTION

It is accordingly an object of the invention to provide a method for operating an internal combustion engine which overcomes the above-mentioned disadvantages of the heretofore-known methods of this general type and which is improved with respect to the metering of the exhaust-gas recirculation and with respect to the implementation of a Miller/Atkinson cycle.

With the foregoing and other objects in view there is provided, in accordance with the invention, a method for operating an internal combustion engine, that includes the steps of:

providing an internal combustion engine having a working cylinder in which a piston is moved up and down so that, within a working cycle of 720 degrees of a crankshaft, successively an intake stroke, a compression stroke, a power stroke and an exhaust stroke are performed and which has at least three gas exchange valves assigned thereto, the internal combustion engine having an exhaust-gas line and having at least one inlet port which leads into a gas exchange valve configured as an inlet valve and which, via the inlet valve, supplies at least combustion air to the working cylinder, the internal combustion engine having at least one outlet port which leads into a gas exchange valve configured as an outlet valve and which, via the outlet valve, discharges at least exhaust-gas from the working cylinder into the exhaust-gas line, and the internal combustion engine having at least one exhaust-gas recirculation line which is connected to the exhaust-gas line of the internal combustion engine, wherein at least one of the gas exchange valves is used by the working cylinder as an EGR valve and is supplied with exhaust-gas from an exhaust-gas recirculation line; and opening the EGR valve at least twice in a predetermined operating state of the internal combustion engine within a working cycle of 720 degrees of the crankshaft, wherein an opening duration of a first opening of the EGR valve at least overlaps in time with an opening of the outlet valve during the exhaust stroke and wherein an opening duration of a second opening of the EGR valve at least overlaps in time with an opening duration of the inlet valve during the intake stroke, wherein the EGR valve is closed between the first and the second opening.

In other words, according to the invention, there is provided a method for operating an internal combustion engine having at least one working cylinder in which a piston is moved up and down so that, within a working cycle of 720 degrees of the crankshaft, successively an intake stroke, a compression stroke, a power stroke and an exhaust stroke are performed and which has at least three gas exchange valves assigned thereto, having an exhaust-gas line, having at least one inlet port which leads into a gas exchange valve in the form of an inlet valve and which, via this inlet valve, supplies at least combustion air to the working cylinder, having at least one outlet port which leads into a gas exchange valve in the form of an outlet valve and which, via this outlet valve, discharges at least exhaust-gas from the working cylinder into the exhaust-gas line, and having at least one exhaust-gas recirculation line which is connected to the exhaust-gas line of the internal combustion engine, wherein at least one of the gas exchange valves is used by at least one of the working cylinders as an EGR valve and is supplied with exhaust-gas from the exhaust-gas recirculation line, the method being characterized in that in a predetermined operating state of the internal combustion engine, within a working cycle of 720 degrees of the crankshaft, the EGR valve is opened at least twice, wherein an opening duration of the first opening of the EGR valve at least overlaps in time with an opening of the outlet valve during the exhaust stroke and wherein an opening duration of the second opening of the EGR valve at least overlaps in time with an opening duration of the inlet valve during the intake stroke, wherein the EGR valve is closed between the first and the second opening.

This has the advantage that, without additional valves or actuators, at the same time an internal and external exhaust-gas recirculation is implemented within a working cycle of the internal combustion engine with a high metering accuracy for the recirculated exhaust-gas.

A simultaneous implementation of an exhaust-gas recirculation and a Miller/Atkinson cycle by means of an EGR valve without additional valves or actuators, wherein an additional volume for temporary storage of a cylinder charge, which has been expelled, is available in the form of an exhaust-gas recirculation line, is provided in that in a predetermined operating state of the internal combustion engine within a working cycle of 720 degrees of the crankshaft, the EGR valve is closed temporally after a bottom dead center between an intake stroke and a compression stroke so late after the beginning of the compression stroke and temporally after a closing of the inlet valve that a portion of the cylinder charge is pushed out into the exhaust-gas recirculation line before a compression stroke begins, so that the internal combustion engine is operated with a Miller/Atkinson cycle. In other words, a mode of the invention includes, in a predetermined operating state of the internal combustion engine within the working cycle of 720 degrees of the crankshaft, closing the EGR valve temporally after a bottom dead center between an intake stroke and a compression stroke so late after a start of the compression stroke and temporally after closing the inlet valve so that a portion of a cylinder charge is expelled into the exhaust-gas recirculation line before a compression stroke begins, so that the internal combustion engine is operated with a Miller/Atkinson cycle.

An internal exhaust-gas recirculation is implemented by selecting the opening duration of the first opening of the EGR valve such that an opening time (point in time of opening) of the EGR valve for the first opening occurs in time at or after an opening time of the outlet valve for the exhaust stroke and a closing time (point in time of closing) of the EGR valve for the first opening time occurs in time at or before a closing time of the outlet valve for the exhaust stroke. In other words, a mode of the invention includes selecting the opening duration of the first opening of the EGR valve such that an opening time of the EGR valve for the first opening is temporally at or after an opening time of the outlet valve for the exhaust stroke and such that a closing time of the EGR valve for the first opening is temporally at or before a closing time of the outlet valve for the exhaust stroke.

An external exhaust-gas recirculation is implemented by selecting the opening duration of the second opening of the EGR valve such that an opening time of the EGR valve for the second opening occurs in time at or after an opening time of the inlet valve for the intake stroke and a closing time of the EGR valve for the second opening occurs in time at or before a closing time of the inlet valve for the intake stroke. In other words, a mode of the invention includes selecting the opening duration of the second opening of the EGR valve such that an opening time of the EGR valve for the second opening is temporally at or after an opening time of the inlet valve for the intake stroke and such that a closing time of the EGR valve for the second opening is temporally at or before a closing time of the inlet valve for the intake stroke.

A further mode of the invention includes supplying the inlet valve only with fresh air or a basic amount of EGR.

Another mode of the invention includes supplying the EGR valve with pure exhaust-gas or fresh air mixed with exhaust-gas from a cooled or an uncooled low-pressure EGR circuit.

A further mode of the invention includes supplying the EGR valve with pure exhaust-gas or fresh air mixed with exhaust-gas from a cooled or an uncooled high-pressure EGR circuit.

An optimal adjustment of an operating point of the internal combustion engine with minimized pollutant emissions is achieved by supplying the inlet valve only with fresh air or a basic amount of EGR, by supplying the EGR valve with pure exhaust-gas or exhaust-gas which is mixed with fresh air, from a cooled or uncooled low-pressure EGR circuit and/or by supplying the EGR valve with pure exhaust-gas or fresh air mixed with exhaust-gas from a cooled or uncooled high-pressure EGR circuit.

Other features which are considered as characteristic for the invention are set forth in the appended claims.

Although the invention is illustrated and described herein as embodied in a method for operating an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
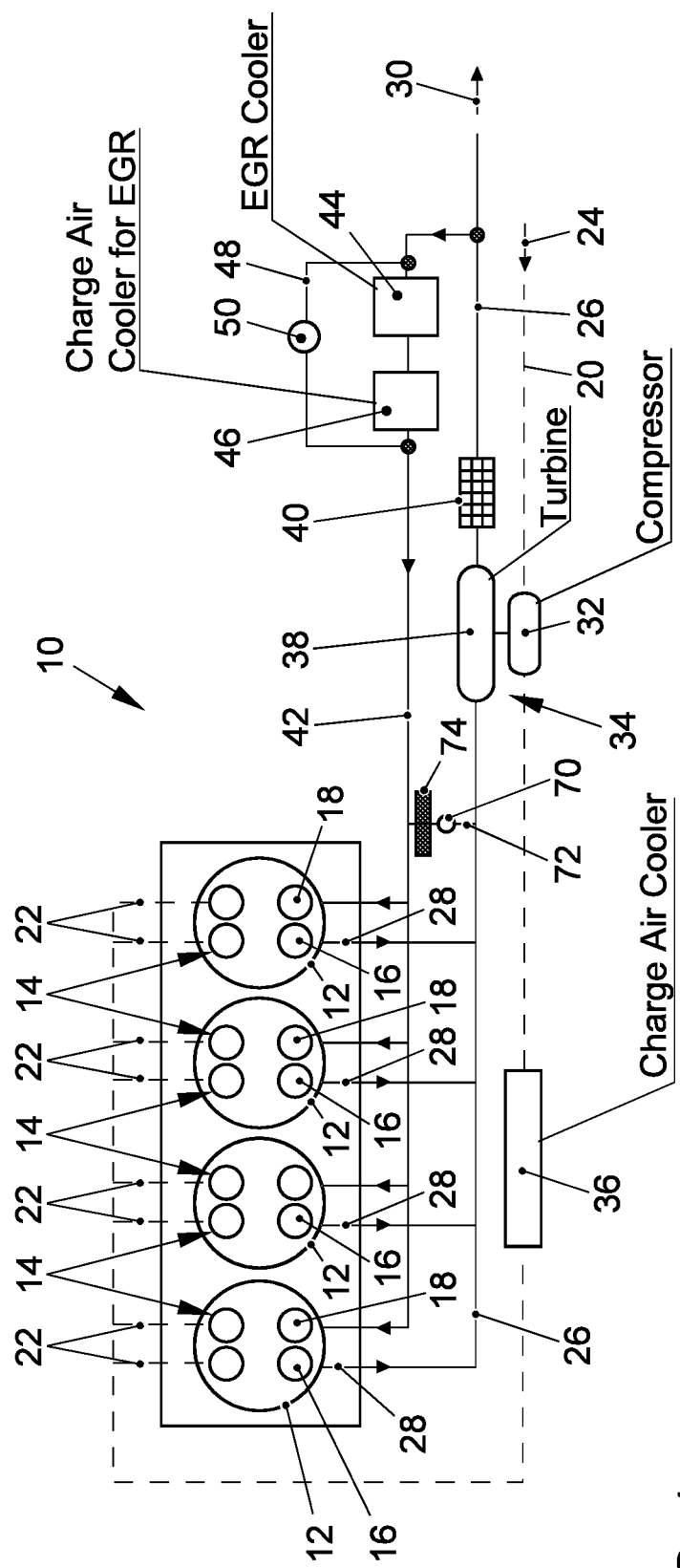
FIG. 1 is a schematic block diagram of a preferred embodiment of an internal combustion engine for performing the method according to the invention.

Referring now to the figures of the drawings in detail and first, particularly, to FIG. 1 thereof, there is shown an exemplary embodiment of an internal combustion engine 10 for performing the method according to the invention. The internal combustion engine 10 includes working cylinders 12, wherein each working cylinder 12 has inlet valves (intake valves) 14 and an outlet valve (exhaust valve) 16 assigned thereto. Further, each working cylinder 12 has a further gas exchange valve 18 assigned thereto. By way of a fresh air supply 20, the working cylinders 12 are supplied, via the inlet valves 14 and corresponding inlet ports 22 opening into the inlet valves 14, with fresh air 24 as combustion air and, by way of an exhaust-gas line 26, exhaust-gas 30 is discharged from the working cylinders 12 via the outlet valves 16 and corresponding outlet ports 28 opening into the outlet valves 16. A piston is disposed movably up and down in each working cylinder 12, so that in each working cylinder, within a working cycle of 720 degrees of the crankshaft (crankshaft angle), successively an intake stroke, a compression stroke, a power stroke and an exhaust stroke is performed.

A compressor 32 of an exhaust-gas turbocharger 34 and a charge air cooler 36 are disposed in the fresh air supply 20. A turbine 38 of the exhaust-gas turbocharger 34 and a particulate filter 40, such as a diesel particulate filter, are disposed in the exhaust-gas line 26. Furthermore, an exhaust-gas recirculation line 42 is provided for recirculating exhaust-gas 30 in the combustion process in the working cylinder 12. This exhaust-gas recirculation line 42 is connected, downstream of the turbine 38, to the exhaust-gas line 26 and has an EGR cooler 44 and a charge air cooler 46 for EGR, the latter being optionally embodied as an integral structural unit with the charge air cooler 36. Furthermore, a bypass line 48 is provided in the exhaust-gas recirculation line 42, which bypass line bridges the EGR cooler 44 and the charge air cooler 46 for EGR and which has a bypass valve 50.

The respective fourth gas exchange valve 18 of each working cylinder 12 is neither connected to an inlet port 22 nor connected to an outlet port 28, but is connected to the exhaust-gas recirculation line 42. In this manner, one of the gas exchange valves of each working cylinder that is actuated by a respective camshaft serves directly as an EGR valve.

Figure 4:
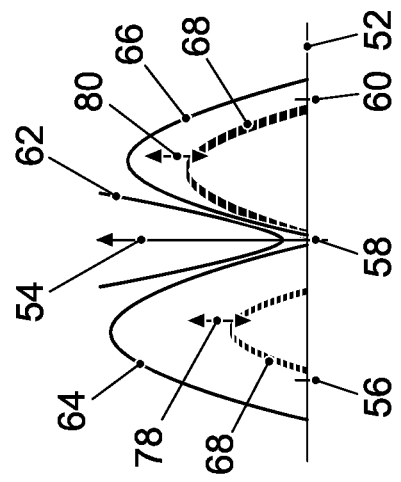
FIG. 4 is a graph illustrating the piston movement and the valve movement of inlet and outlet valves and of a gas exchange valve that is used as an EGR valve, wherein an internal and an external EGR is implemented at the same time with the EGR valve opening twice in accordance with the invention.
Figure 3:
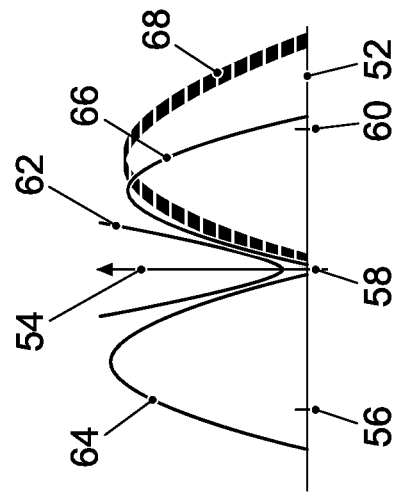
FIG. 3 is a graph illustrating the piston movement and the valve movement of inlet and outlet valves and of a gas exchange valve that is used as an EGR valve, wherein a Miller/Atkinson cycle is implemented with a lot of EGR.
Figure 2:
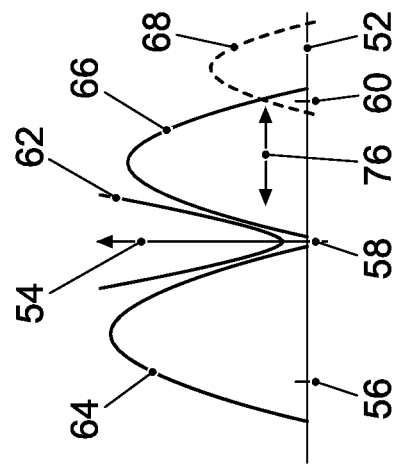
FIG. 2 is a graph illustrating the piston movement and the valve movement of inlet and outlet valves and of a gas exchange valve that is used as an EGR valve, wherein a Miller/Atkinson cycle is implemented with little EGR.

In FIGS. 2 to 4, a crank angle is plotted on a horizontal axis 52, and a stroke movement is plotted on a vertical axis 54. On the horizontal axis 52, a bottom dead center (BDC) of the reciprocating piston before the charge exchange (between power stroke and exhaust stroke) is plotted at 56, a top dead center (TDC) of the reciprocating piston during the charge exchange (between exhaust stroke and intake stroke) is plotted at 58 and a bottom dead center (BDC) of the reciprocating piston after the charge exchange (between intake stroke and compression stroke) is plotted at 60. A first graph 62 illustrates the stroke movement 54 plotted over the crank angle 52 for the piston, a second graph 64 illustrates the stroke movement 54 over the crank angle 52 for the outlet valves 16, a third graph 66 illustrates the stroke movement 54 over the crank angle 52 for the inlet valves 14 and a fourth graph 68 (dashed line) illustrates the stroke movement 54 over the crank angle 52 for those gas exchange valves 18 that are neither connected to an inlet port 22 nor connected to an outlet port 28, but are connected to the exhaust-gas recirculation line 42 (EGR valves).

In the first alternative according to FIG. 2 an external exhaust-gas recirculation takes place while the inlet valves 14 are open, and even afterwards. Here, the inlet valve 14 indeed closes in a normal manner in accordance with the third graph 66, but the EGR valve 18 remains open longer in accordance with the fourth graph 68 and closes only after the closing of the inlet valve 14 according to the third graph 66 and after the BDC 60. In this manner, a Miller/Atkinson cycle is implemented, because the EGR valve 18 remains open during the compression stroke after the BDC 60 according to the fourth graph 68, so that a portion of the cylinder charge, which has previously been supplied via the inlet valve 14, is expelled into the exhaust-gas recirculation line 42, before the actual compression begins after closing also the EGR valve 18 according to the fourth graph 68. By shifting the opening of the EGR valve 18 along the direction of the arrow 76, the Miller/Atkinson cycle is more pronounced or less pronounced. At the same time, the height of the fourth graph 68 as well as the opening duration controls the amount of the external exhaust-gas recirculation. In the example according to FIG. 2, a small amount of exhaust-gas is recirculated. Altogether, the Miller/Atkinson cycle and the EGR are thus implemented at the same time by means of the EGR valve 18, so that no additional valve control time adjustment (VVT, variable valve timing) is required for the inlet valves 14 and outlet valves 16. The control of the inlet valves 14 and outlet valves 16 may be performed with fixed cams and without a camshaft adjustment or the like.

In the second alternative according to FIG. 3, the external exhaust-gas recirculation takes place during and after the inlet valves 14 are opened. In contrast to the first alternative according to FIG. 2, the fourth graph 68 is significantly higher and the opening time of the EGR valves 18 much longer, so that a large amount of exhaust-gas is recirculated. As is the case in the first alternative according to FIG. 2, the Miller/Atkinson cycle and at the same time the EGR is implemented by a late closing of the EGR valves 18. The inlet valves 14 close in a normal manner, i.e. not for a Miller/Atkinson cycle. In the embodiment according to FIG. 2 as well as in the embodiment according to FIG. 3, despite the implementation of a Miller/Atkinson cycle there is no expulsion of a portion of the cylinder charge into the inlet port 22, but in the EGR line 42.

In the third alternative according to FIG. 4, the EGR valves 18 are in each case opened twice within a working cycle of 720 degrees of the crankshaft, wherein each working cycle for each working cylinder includes in each case an intake stroke, a compression stroke, a power stroke and an exhaust stroke. The first opening of the EGR valves 18 according to the fourth graph 68 occurs between the BDC (bottom dead center) 56 and the TDC (top dead center) 58 while the outlet valve 16 is open according to the second graph 64. This results in an internal EGR via the EGR valve 18, because exhaust-gas is to some extent pushed out from the working cylinder not into the outlet port 28, but rather into the EGR line 42 and is later again sucked into the working cylinder. The second opening of the EGR valves 18 according to the fourth graph 68 takes place between the TDC 58 and the BDC 60 while the inlet valve 14 is open in accordance with the third graph 66. Here, on the one hand, the exhaust-gas of the previous working cycle that has previously been pushed out into the EGR line 42, is again sucked into the working cylinder and, at the same time, exhaust-gas is externally recirculated. By shaping the fourth graph 68 to be higher for the second opening in comparison with the first opening of the EGR valve 18, the previously expelled exhaust-gas is completely fed into the working cylinder and additionally exhaust-gas is externally supplied. This is indicated by arrow 78 for the first opening of the EGR valve 18 and arrow 80 for the second opening of the EGR valve 18.

In the illustrated internal combustion engine it is provided that, in an engine configuration with more than two valves per working cylinder 12, a gas exchange valve 18 is employed solely for the metering of exhaust-gas recirculation/residual gas. The feeding of this EGR valve 18 with a separate inlet port is carried out for example via the following variants:

Pure exhaust-gas from a cooled low-pressure EGR loop (optionally with its own compressor stage);

Pure exhaust-gas from a cooled high-pressure EGR loop;

Pure exhaust-gas from an uncooled high-pressure EGR loop;

Air/exhaust-gas mixture of the aforementioned variants.

In all variants, the actual inlet valves are supplied only with fresh air or a basic amount of EGR.

The control of the gas exchange valve 18 and optionally also of the further gas exchange valves 14, 16 is implemented by means of a variable valve train (mechanical, electrical or hydraulic) and can, with respect to the point in time, take place in parallel to the intake as well as shifted in time. The metering of recirculated exhaust-gas is thus adjusted at each individual working cylinders 12 by positioning, lift height and control width (spread angle) of the control of the gas exchange valves 18 and, respectively, 14, 16.

The advantage of this configuration, in addition to the ability for a cycle-accurate metering of the EGR, is mainly the utilization of the entire exhaust-gas energy on the turbine side, whereas when compared to a conventional low pressure configuration only the fresh air mass flow has to be compressed. The EGR mass flow is drawn in via the EGR valve 18 directly by the engine. The optional coolers 44, 46 and the bypasses 50 serve in this case for an air-side and exhaust-gas side temperature management. An optional additional switching valve 70 in a connecting line 72 between the exhaust-gas line 26 upstream of the turbine 38 and the exhaust-gas recirculation line 42 allows the use of high-pressure (HP) EGR and/or a low-pressure (LP) EGR. Optionally, a cooler 74 is additionally disposed in the connecting line 72.

The fully variable EGR valve 18 is used, by a skillful arrangement of the control times, for implementing a Miller/Atkinson cycle with a late intake closing of the EGR valve 18. By means of a multiple actuation of the EGR valve 18 within a working cycle, a combination of internal and external EGR is achieved via a single valve. The control times of all other inlet and outlet valves 14, 16 can in this case remain fixed and can be actuated by a simple cam-driven control assembly. Unlike in the case of the conventional Miller/Atkinson cycle, the cylinder charge is not pushed back into the intake tract, but in the EGR tract or the EGR line 42. The same applies for the internal EGR by means of the EGR valve 18 opening twice, as shown in FIG. 4.

The invention claimed is:

1. A method for operating an internal combustion engine, the method which comprises:

providing an internal combustion engine having a working cylinder in which a piston is moved up and down so that, within a working cycle of 720 degrees of a crankshaft, successively an intake stroke, a compression stroke, a power stroke and an exhaust stroke are performed and which has at least three gas exchange valves assigned thereto, the internal combustion engine having an exhaust-gas line and having at least one inlet port which leads into a gas exchange valve configured as an inlet valve and which, via the inlet valve, supplies at least combustion air to the working cylinder, the internal combustion engine having at least one outlet port which leads into a gas exchange valve configured as an outlet valve and which, via the outlet valve, discharges at least exhaust-gas from the working cylinder into the exhaust-gas line, and the internal combustion engine having at least one exhaust-gas recirculation line which is connected to the exhaust-gas line of the internal combustion engine, wherein at least one of the gas exchange valves is used by the working cylinder as an EGR valve and is supplied with exhaust-gas from an exhaust-gas recirculation line; and opening the EGR valve at least twice in a predetermined operating state of the internal combustion engine within a working cycle of 720 degrees of the crankshaft, wherein an opening duration of a first opening of the EGR valve at least overlaps in time with an opening of the outlet valve during the exhaust stroke and wherein an opening duration of a second opening of the EGR valve at least overlaps in time with an opening duration of the inlet valve during the intake stroke, wherein the EGR valve is closed between the first and the second opening.

2. The method according to claim 1, which comprises, in a predetermined operating state of the internal combustion engine within a working cycle of 720 degrees of the crankshaft, closing the EGR valve temporally after a bottom dead center between an intake stroke and a compression stroke so late after a start of the compression stroke and temporally after closing the inlet valve so that a portion of a cylinder charge is expelled into the exhaust-gas recirculation line before a compression stroke begins, so that the internal combustion engine is operated with a Miller/Atkinson cycle.

3. The method according to claim 1, which comprises selecting the opening duration of the first opening of the EGR valve such that an opening time of the EGR valve for the first opening is temporally at or after an opening time of the outlet valve for the exhaust stroke and such that a closing time of the EGR valve for the first opening is temporally at or before a closing time of the outlet valve for the exhaust stroke.

4. The method according to claim 1, which comprises selecting the opening duration of the second opening of the EGR valve such that an opening time of the EGR valve for the second opening is temporally at or after an opening time of the inlet valve for the intake stroke and such that a closing time of the EGR valve for the second opening is temporally at or before a closing time of the inlet valve for the intake stroke.

5. The method according to claim 1, which comprises supplying the inlet valve only with fresh air or a basic amount of EGR.

6. The method according to claim 1, which comprises supplying the EGR valve with pure exhaust-gas or fresh air mixed with exhaust-gas from a cooled or an uncooled low-pressure EGR circuit.

7. The method according to claim 1, which comprises supplying the EGR valve with pure exhaust-gas or fresh air mixed with exhaust-gas from a cooled or an uncooled high-pressure EGR circuit.

* * * * *